March 18, 1969  C. J. PETERS  3,433,553
LIGHT DEPOLARIZER
Filed Nov. 4, 1964

INVENTOR
CHARLES J. PETERS

BY
ATTORNEY

_United States Patent Office_

3,433,553
Patented Mar. 18, 1969

3,433,553
LIGHT DEPOLARIZER
Charles Jack Peters, Wayland, Mass., assignor to Sylvania Electric Products Inc., a corporation of Delaware
Filed Nov. 4, 1964, Ser. No. 408,810
U.S. Cl. 350—157
Int. Cl. G02f 1/24; G02b 5/30, 27/28
6 Claims

ABSTRACT OF THE DISCLOSURE

A light depolarizer employs a plate of birefringent material having a surface with a random roughness related to the difference between the refractive indices of said material.

---

This invention relates to optical devices and particularly to optical depolarizing elements.

Light is often polarized to verying degrees by transmission through certain materials, such as dispersing prisms. This polarization is deleterious in many instances; for example, in instruments of analysis employing unpolarized light wherein specimens exhibit polarizing tendencies. It is clear that unwanted polarization would confuse the measurement being made with such instruments. Many means for polarizing a beam of light are known; however, no simple and fully satisfactory depolarizing means is known. Heretofore, several schemes have been suggested, but suffer from one disadvantage or another. Known techniques are discussed, for example, in the book "Polarized Light" by William A. Shurcliff, Harvard University Press, 1962, pp. 107–108, and in the "Journal of the Optical Society of America," Volume 41, pp. 966–975. Of the known techniques, the least deficient are the depolarizers of Lyot and Billings discussed in the above-identified article. The Lyot device consists of two x-cut retardation plates of quartz whose thickness is in the ratio 2:1, and whose axes are at 45° to one another. Only light having a wide bandwidth can be depolarized by this technique, and even then, complete depolarization is not possible. The Billings device employs two variable wave plates of z-cut birefringent material whose fast axes are disposed at 45° to each other. An electric field is provided to vary the retardation of the plates, the first plate being varied linearly from zero to $2\pi$, and the second plate from zero to $4\pi$. This depolarizer is useful only with monochromatic light. In addition, it is an active device requiring energizing power to vary the electric field. Billings also suggests a depolarizer using a quarter-wave plate rotating at one speed, and a half-wave plate rotating at twice the speed of the first. This scheme is also useful only with monochromatic light and, again, is an active device requiring energizing power.

It is, therefore, a primaryobject of the present invention to provide a simple and effective optical depolarizer.

Another object of the invention is to provide a depolarizer useful with both narrow band and wide band light.

Another object of the invention is to provide a passive depolarizer operative with both narrow band and wide band light.

Briefly, the invention, in its simplest form, comprises a plate of birefringent material having a roughened surface and disposed in a medium having substantially the same index of refraction as the birefringent plate.

The construction and operation of the invention will be more fully understood from the following detailed description, taken in conjunction with the accompanying drawings, in which.

Applicant has discovered that polarized light becomes depolarized upon transmission through a suitably oriented roughened retardation plate. By action of a retardation plate, the polarization states of an initially linearly polarized light beam disposed with its electric vector at 45° to the optical axis of the plate are varied cyclically as the beam passes through the plate. The light beam goes through a complete cycle of polarization states in a given distance measured along the light path. This distance is related to the difference between the refractive indices of the material, as measured along the two optical axes, and is about eight microns for ammonium dihydrogen phosphate and potassium dihydrogen phosphate. This mechanism is employed in accordance with the invention by randomly varying the thickness of the retardation plate over the given distance to produce a complete set of polarization states. Variation of plate thickness is best accomplished by roughening the surface of the plate, for example by etching, sandblasting or with a diamond saw. Each element of the roughened surface produces a unique polarization; however, the rays passing through these elements smear together due to diffraction spreading to provide a light beam having all polarization states; that is, unpolarized light. To prevent dispersion of the light beam due to the surface roughness of the retardation plate, it is disposed in a medium having substantially the same refractive index as the average refractive index of the plate.

Figure 1:
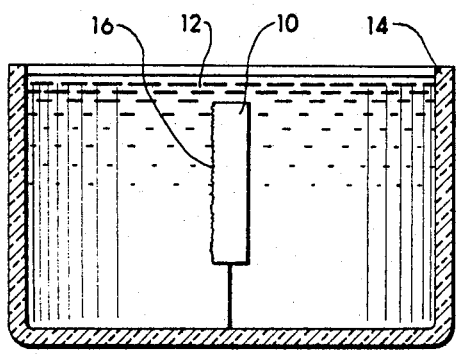
FIG. 1 is a diagrammatic elevation view, partly in section, of one embodiment of the invention.

A depolarizer embodying the invention is shown in FIG. 1 and comprises a plate of birefringent material 10, such as ammonium dihydrogen phosphate (ADP), potassium dihydrogen phosphate (KDP), mica, quartz, or stressed plastic, immersed in a fluid 12 contained within a vessel 14. Plate 10 has a surface 16 roughened, for example, by a diamond saw to a degree governed by the particular material employed. For illustrative purposes, the surface roughness is shown greatly exaggerated. For example, a plate of ADP or KDP is roughened to eight microns or more. Fluid 12 has approximately the same index of refraction as the average index of plate 10, and prevents scattering of the light beam due to the roughness of surface 16.

Figure 2:
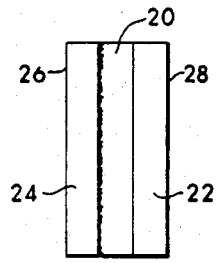
FIG. 2 is a diagrammatic elevation view of another embodiment of the invention.

Another embodiment of the invention is illustrated in FIG. 2, wherein a roughened retardation plate 20 is disposed between cover plates 22 and 24. The cover plates have approximately the same refractive index as plate 20 and have smooth surfaces 26 and 28 to prevent dispersion of the light beam due to the rough surface of plate 20. Any birefringent material can be used to fabricate plate 20. Typically, plate 20 is bonded to the cover plates by a cement of substantially the same refractive index as plate 20; or, if plastic material is used, the structure may be laminated by well known means.

In operation, a linearly polarized light beam passing through the depolarizer of FIG. 1 or FIG. 2 with its electric vector at 45° to the optical axis thereof is depolarized due to the action of the device. If the axis of the linearly polarized light is not known, or if the light is other than linearly polarized, complete depolarization would not be achieved since the incident light beam would not be disposed at 45° to the optical axis of the depolarizer. These embodiments, therefore, provide complete depolarization only for a suitably oriented linearly polarized light beam.

Figure 3:
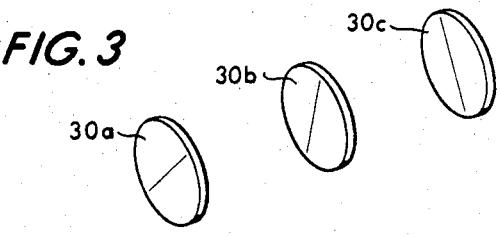
FIG. 3 is a diagrammatic pictorial view of a further embodiment of the invention.

The embodiment of FIG. 3 provides a depolarizer operative with any input polarization. Referring to this figure, there is shown a plurality of roughened retardation plates 30a, 30b and 30c, each disposed with its optical axis at an angle to the axis of the adjacent plate. A beam of light of any polarization passing through the plates will be substantially depolarized since the components of the input polarization will be in the preferred orientation to some of the plates; that is, with the electric vector at 45° to the optical axis. The effectiveness of the depolarization is dependent upon the number of plates employed, more complete depolarization being achieved with greater numbers of plates disposed with smaller angular increments between their optical axes. In a two plate version of the embodiment of FIG. 3, the plates were disposed with their axes at 45° to each other, and were cemented between smooth cover plates, as described hereinbefore, to minimize light dispersion. Alternatively, the retardation plates may be immersed in a fluid having substantially the same refractive index as the plates, as in FIG. 1. Measurements indicated that at least 85% of the incident polarized light was depolarized with this two plate version.

From the foregoing, it is evident that an extremely simple and effective passive optical depolarizer has been provided. Various implementations and constructions of the invention will occur to those versed in the art without departing from the scope of the invention. Accordingly, it is not intended to limit the invention to what has been particularly shown and described, except as indicated in the appended claims.

What is claimed is:

1. A depolarizer for depolarizing a light beam having its electric vector disposed at approximately 45° to the optical axis of said depolarizer comprising a plate of birefringent material having at least one randomly roughened surface, said roughened surface causing said plate of birefringent material to have a thickness of random variation.

2. A depolarizer for depolarizing a light beam having its electric vector disposed at approximately 45° to the optical axis of said depolarizer comprising a plate of birefringent material having a surface with a random roughness which causes said plate of birefringent material to have a randomly varying thickness and wherein said thickness is related to the difference between the refractive indices of said material.

3. A depolarizer for depolarizing a light beam having its electric vector disposed at approximately 45° to the optical axis of said depolarizer comprising a plate of birefringent material having a randomly roughened surface, said roughened surface being operative to give said plate of birefringent material a thickness of random variation; and means proximate said plate for preventing light dispersion from said roughened surface.

4. A depolarizer comprising a plurality of retardation plates each having a randomly roughened surface, said roughened surface causing each of said plurality of retardation plates to have a randomly varying thickness, and each plate having its optical axis angularly displaced from the optical axis of the next adjacent plate, and means proximate said plates for preventing light dispersion from said roughened surface.

5. A depolarizer for depolarizing linear polarized light comprising, a retardation plate having a roughened surface with a random roughness related to the difference between the refractive indices of said retardation plate and wherein said roughness causes said retardation plate to have a randomly varying thickness, and said retardation plate disposed with its optical axis at 45° to the electric vector of said linearly polarized light, and means proximate said plate having a refractive index substantially equal to the average refractive index of said plate and operative to prevent light dispersion from said roughened surface.

6. A depolarizer for depolarizing a light beam having its electric vector disposed at approximately 45° to the optical axis of said depolarizer comprising, first and second transparent cover plates, and a plate of birefringent material bonded between said cover plates, said plate of birefringent material having a surface with a random roughness substantially equal to the difference between the refractive indices of said material, wherein said roughness causes said plate of birefringent material to have a randomly varying thickness and said cover plates having an index of refraction substantially equal to the average refractive index of said birefringent plate.

References Cited

UNITED STATES PATENTS 2,275,602    3/1942    Beck et al.
2,887,566    5/1959    Marks.

OTHER REFERENCES

Shurcliff, Polarized Light, Harvard University Press, Cambridge, Mass., 1962, pp. 107–108.

DAVID SCHONBERG, *Primary Examiner.*

PAUL R. MILLER, *Assistant Examiner.*

U.S. Cl. X.R.

350—147, 152, 153